United States Patent
Petersen et al.

(10) Patent No.: US 9,898,794 B2
(45) Date of Patent: Feb. 20, 2018

(54) HOST-BASED GPU RESOURCE SCHEDULING

(71) Applicant: VMware, Inc., Palo Alto, CA (US)

(72) Inventors: Daniel James Petersen, Morgan Hill, CA (US); Si Chen, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 364 days.

(21) Appl. No.: 14/309,267

(22) Filed: Jun. 19, 2014

(65) Prior Publication Data
US 2015/0371354 A1 Dec. 24, 2015

(51) Int. Cl.
| | |
|---|---|
| *G06T 1/20* | (2006.01) |
| *G06F 9/455* | (2006.01) |
| *G06F 9/50* | (2006.01) |
| *G09G 5/36* | (2006.01) |

(52) U.S. Cl.
CPC ............ *G06T 1/20* (2013.01); *G06F 9/45533* (2013.01); *G06F 9/5083* (2013.01); *G09G 5/363* (2013.01); *G06F 2009/4557* (2013.01); *G06F 2009/45579* (2013.01); *G09G 2360/08* (2013.01)

(58) Field of Classification Search
None
See application file for complete search history.

(56) References Cited

U.S. PATENT DOCUMENTS

| | | | | |
|---|---|---|---|---|
| 2010/0115510 A1* | 5/2010 | Ford | ...................... | G06F 9/5077 718/1 |
| 2012/0084774 A1* | 4/2012 | Post | ...................... | G06F 9/5088 718/1 |
| 2013/0174144 A1* | 7/2013 | Cheng | ................. | G06F 9/45558 718/1 |
| 2014/0184622 A1* | 7/2014 | Xia | ........................... | G06T 1/20 345/522 |
| 2014/0215462 A1* | 7/2014 | Kuo | .................... | G06F 9/45533 718/1 |
| 2016/0239333 A1* | 8/2016 | Cowperthwaite | ....... | G06F 9/461 |

OTHER PUBLICATIONS

Gupta et al., "GViM: GPU-accelerated Virtual Machines", 3rd Workshop on System-level Virtualization for High Performance Computing, 2009, 8 pages.
Unknown, "Credit Scheduler", Xen Project, accessed from <<http://wiki.xen.org/wiki?title=Credit_Scheduler>>, 2013, 4 pages.
Unknown, "Network I/O Resource Management in vSphere 4.1 and vSphere 5.x with vDS", Knowledge Base, accessed from <<http://kb.vmware.com/selfservice/microsites/search.do? language=en_US&cmd=displayKC&externalId=1022585>>, VMware, Inc., accessed on Jun. 19, 2014, 2 pages.

* cited by examiner

Primary Examiner — Maurice L McDowell, Jr.
Assistant Examiner — Donna J Ricks

(57) ABSTRACT

Examples allocate and schedule use of graphics processing unit (GPU) resources among a plurality of users executing virtual machines (VMs) or processes. During initialization, shares representing proportional access to the GPU resources are assigned and then adjusted based on graphics command characteristics. Quantum is allocated among the VMs based on the shares. At runtime, graphics commands from the VMs are queued and iteratively sent to the GPU based on a comparison between allocated quantum and a threshold quantum. In this manner, the GPU resources are fairly shared among the VMs.

15 Claims, 7 Drawing Sheets

| RUNTIME ARRAY 702 | | | | | |
|---|---|---|---|---|---|
| | TIME 1 | TIME 2 | TIME 3 | TIME 4 | TIME M |
| VM 1 | 0.75 | 1.5 | 0 | 0.75 | ... |
| VM 2 | 1 | 2 | 0.5 | 1.5 | ... |
| VM 3 | 1.25 | 2.5 | 1 | 2.25 | ... |
| ... | ... | ... | ... | ... | ... |
| VM N | 0.5 | 1 | 1.5 | 0 | ... |

*FIG. 7*

HOST-BASED GPU RESOURCE SCHEDULING

CROSS-REFERENCE TO RELATED APPLICATION

This application is related to a U.S. patent application entitled "Host-Based Heterogeneous Multi-GPU Assignment", filed concurrently herewith, which is incorporated by reference herein in its entirety.

BACKGROUND

Some existing systems perform graphics commands received from various processes. Specifically, hardware including graphics processing units (GPUs) manages execution of the graphics commands. The graphics commands may vary in complexity between two-dimensional commands, three-dimensional commands, surface mapping commands, shading commands, texture rendering commands, and the like. Depending on the complexity of a graphics command, performance of the graphics command may utilize more or less of the GPU resources available to all the processes. Some of the processes, such as virtual machines (VMs), may be operated by different customers, tenants, or users on the same system. Disparity among the needs of the different users and among the different graphics commands often results in an unfair disparity of use of the GPU. In some instances, monopolization of the GPU resources occurs.

In some existing systems, a driver for the GPU resides in kernel space and considers all graphics commands as originating from a single user. In such systems, the GPU executes the graphics commands in a first-in, first-out manner. The GPU does not consider the size or complexity of each graphics command. Further, the GPU does not recognize any prioritization among the graphics commands.

SUMMARY

One or more examples described herein fairly allocate use of a graphics processing unit (GPU) to a plurality of virtual machines (VMs) or processes. A computing device assigns shares to a user having one or more VMs. The computing device adjusts the assigned shares based on graphics command characteristics associated with the VMs, and allocates quantum among the VMs based on the adjusted, assigned shares. The allocated quantum for each of the VMs is transmitted to a GPU driver. Based on the allocated quantum, the computing device schedules graphics commands from the VMs for performance by the GPU. The GPU performs the graphics operations based on the transmitted, allocated quantum.

This summary introduces a selection of concepts that are described in more detail below. This summary is not intended to identify essential features, nor to limit in any way the scope of the claimed subject matter.

BRIEF DESCRIPTION OF THE DRAWINGS

FIG. 7 is an exemplary array maintained by the scheduler to iteratively tabulate the accumulated quantum and compare the accumulated quantum to the threshold quantum.

Corresponding reference characters indicate corresponding parts throughout the drawings.

DETAILED DESCRIPTION

Examples described herein prioritize use of a graphics processing unit (GPU) by a plurality of virtual machines (VMs) and/or processes. In contrast with previous first-in, first-out systems that process graphics commands or operations without regard to priority, aspects of the disclosure schedule graphics commands for execution by the GPU in a prioritized manner specific to the VMs. In some examples, during initialization, shares are assigned to the VMs and adjusted based on graphics command characteristics reflecting the type of graphics commands expected to be received from the VMs. The adjusted shares thereby account for the different resource requirements (e.g., complexity) of the different types of graphics commands expected to be issued by each VM, and represent the relative assigned use of the GPU. Quantum, or other values, is allocated to the VMs based on the adjusted, assigned shares, and is used for scheduling the graphics commands during runtime.

While described with reference to an initialization phase and a runtime phase in some examples, the operations described herein may be executed at any time and are not limited to such timing.

Aspects of the disclosure further communicate values corresponding to the allocated quantum to a GPU driver, and instruct the GPU driver to respect the allocated quantum during execution of the graphics commands. For example, the GPU is expected to suspend performance of a graphics command from a VM if execution of the graphics command exceeds an amount of processing corresponding to the quantum allocated to that VM.

Aspects of the disclosure thus share, in a prioritized manner, use of the GPU among multiple VMs. Further, examples of the disclosure permit a VM-specific and/or process-specific allocation of GPU resources in a manner that permits fair use of the GPU.

Aspects of the disclosure are operable with any module, component, logic, routine, code, and/or process for the prioritized scheduling of the graphics commands from the VMs. An example of such a component includes a kernel mode driver scheduler, or other scheduler. The scheduler, associated with an operating system or a hypervisor, controls the resource allocation of the GPU. The GPU driver is then instructed to follow the resource allocation from the scheduler. An example of such a scheduler is the VMX scheduler by VMware, Inc.

Figure 1:
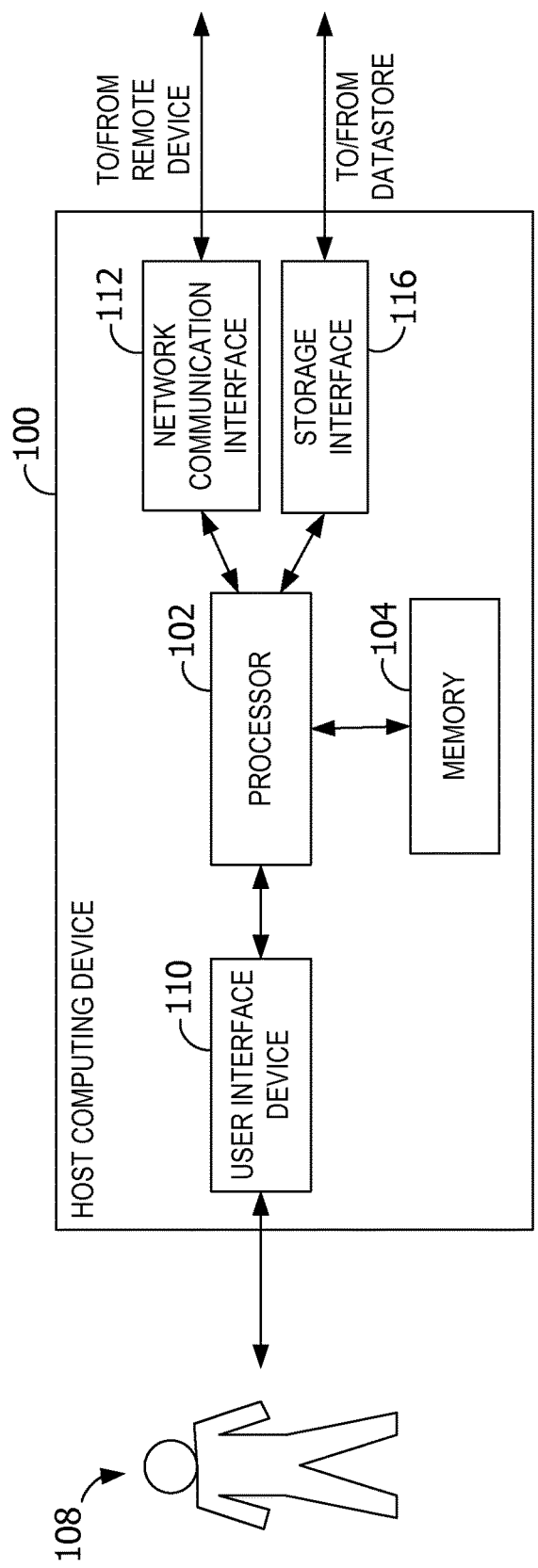
FIG. 1 is a block diagram of an exemplary host computing device.

FIG. 1 is a block diagram of an exemplary host computing device 100. Host computing device 100 includes a processor 102 for executing instructions. In some examples, executable instructions are stored in a memory 104. Memory 104 is any device allowing information, such as executable instructions and/or other data, to be stored and retrieved. For example, memory 104 may include one or more random access memory (RAM) modules, flash memory modules, hard disks, solid-state disks, and/or optical disks. In FIG. 1, memory 104 refers to memory and/or storage. However, in some examples, memory 104 may refer only to memory in host computing device 100, and exclude storage units such as disk drives and hard drives. Other definitions of memory are contemplated.

Host computing device 100 may include a user interface device 110 for receiving data from a user 108 and/or for presenting data to user 108. User 108 may interact indirectly with host computing device 100 via another computing device such as VMware's vCenter Server or other management device. User interface device 110 may include, for example, a keyboard, a pointing device, a mouse, a stylus, a touch sensitive panel (e.g., a touch pad or a touch screen), a gyroscope, an accelerometer, a position detector, and/or an audio input device. In some examples, user interface device 110 operates to receive data from user 108, while another device (e.g., a presentation device) operates to present data to user 108. In other examples, user interface device 110 has a single component, such as a touch screen, that functions to both output data to user 108 and receive data from user 108. In such examples, user interface device 110 operates as a presentation device for presenting information to user 108. In such examples, user interface device 110 represents any component capable of conveying information to user 108. For example, user interface device 110 may include, without limitation, a display device (e.g., a liquid crystal display (LCD), organic light emitting diode (OLED) display, or "electronic ink" display) and/or an audio output device (e.g., a speaker or headphones). In some examples, user interface device 110 includes an output adapter, such as a video adapter and/or an audio adapter. An output adapter is operatively coupled to processor 102 and configured to be operatively coupled to an output device, such as a display device or an audio output device.

Host computing device 100 also includes a network communication interface 112, which enables host computing device 100 to communicate with a remote device (e.g., another computing device) via a communication medium, such as a wired or wireless packet network. For example, host computing device 100 may transmit and/or receive data via network communication interface 112. User interface device 110 and/or network communication interface 112 may be referred to collectively as an input interface and may be configured to receive information from user 108.

Host computing device 100 further includes a storage interface 116 that enables host computing device 100 to communicate with one or more datastores, which store virtual disk images, software applications, and/or any other data suitable for use with the methods described herein. As an example, storage interface 116 couples host computing device 100 to a storage area network (SAN) (e.g., a Fibre Channel network) and/or to a network-attached storage (NAS) system (e.g., via a packet network). Storage interface 116 may be integrated with network communication interface 112.

Figure 2:
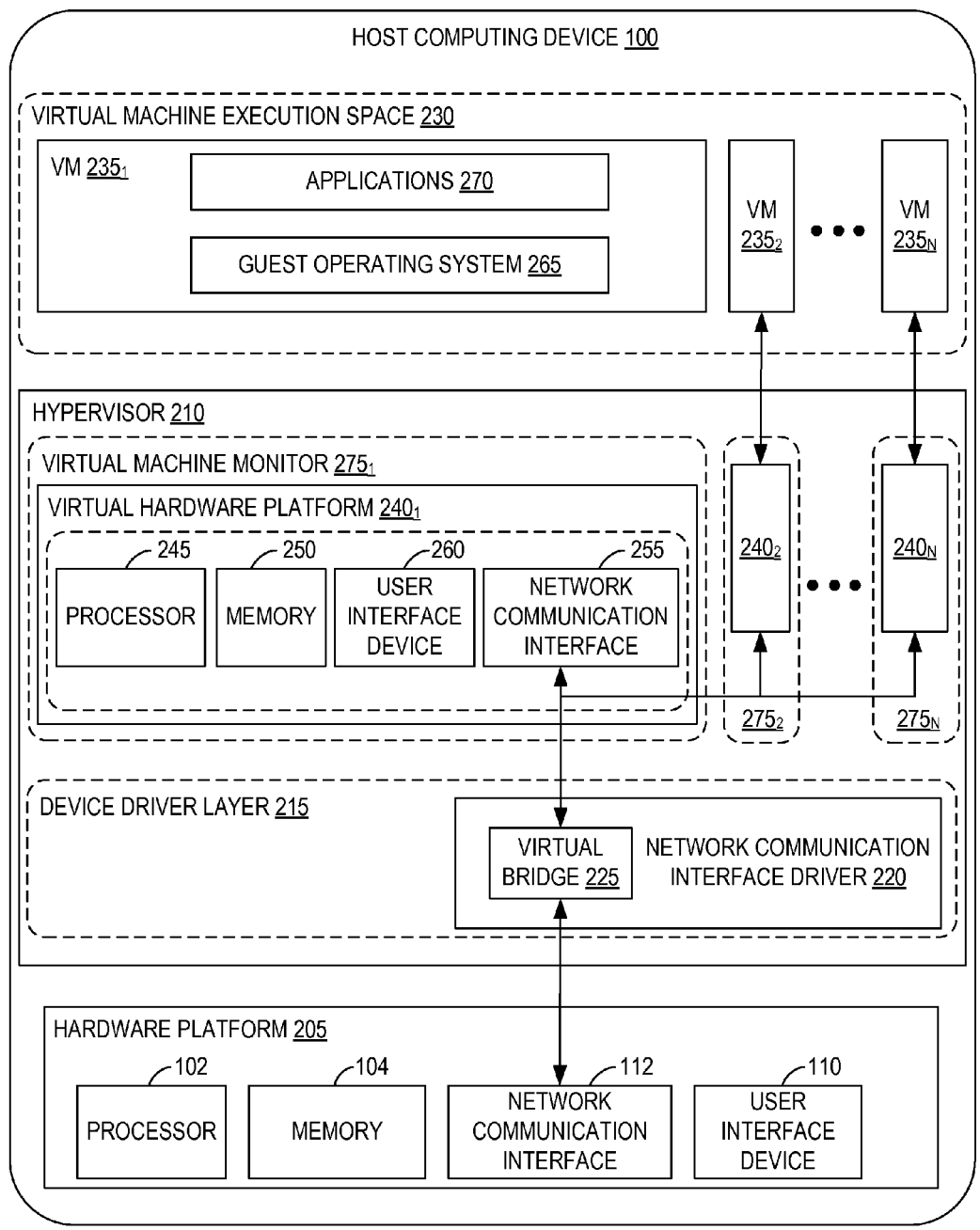
FIG. 2 is a block diagram of virtual machines (VMs) that are instantiated on a computing device, such as the host computing device shown in FIG. 1.

FIG. 2 depicts a block diagram of virtual machines $235_1$, $235_2$ . . . $235_N$ that are instantiated on host computing device 100. Host computing device 100 includes a hardware platform 205, such as an x86 architecture platform. Hardware platform 205 may include processor 102, memory 104, network communication interface 112, user interface device 110, and other input/output (I/O) devices, such as a presentation device 106 (shown in FIG. 1). A virtualization software layer, also referred to hereinafter as a hypervisor 210, is installed on top of hardware platform 205.

The virtualization software layer supports a virtual machine execution space 230 within which multiple virtual machines (VMs $235_1$-$235_N$) may be concurrently instantiated and executed. Hypervisor 210 includes a device driver layer 215, and maps physical resources of hardware platform 205 (e.g., processor 102, memory 104, network communication interface 112, and/or user interface device 110) to "virtual" resources of each of VMs $235_1$-$235_N$ such that each of VMs $235_1$-$235_N$ has its own virtual hardware platform (e.g., a corresponding one of virtual hardware platforms $240_1$-$240_N$), each virtual hardware platform having its own emulated hardware (such as a processor 245, a memory 250, a network communication interface 255, a user interface device 260 and other emulated I/O devices in VM $235_1$). Hypervisor 210 may manage (e.g., monitor, initiate, and/or terminate) execution of VMs $235_1$-$235_N$ according to policies associated with hypervisor 210, such as a policy specifying that VMs $235_1$-$235_N$ are to be automatically restarted upon unexpected termination and/or upon initialization of hypervisor 210. In addition, or alternatively, hypervisor 210 may manage execution VMs $235_1$-$235_N$ based on requests received from a device other than host computing device 100. For example, hypervisor 210 may receive an execution instruction specifying the initiation of execution of first VM $235_1$ from a management device via network communication interface 112 and execute the execution instruction to initiate execution of first VM $235_1$.

In some examples, memory 250 in first virtual hardware platform $240_1$ includes a virtual disk that is associated with or "mapped to" one or more virtual disk images stored on a disk (e.g., a hard disk or solid-state disk) of host computing device 100. The virtual disk image represents a file system (e.g., a hierarchy of directories and files) used by first VM $235_1$ in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

Device driver layer 215 includes, for example, a communication interface driver 220 that interacts with network communication interface 112 to receive and transmit data from, for example, a local area network (LAN) connected to host computing device 100. Communication interface driver 220 also includes a virtual bridge 225 that simulates the broadcasting of data packets in a physical network received from one communication interface (e.g., network communication interface 112) to other communication interfaces (e.g., the virtual communication interfaces of VMs $235_1$-$235_N$). Each virtual communication interface for each VM $235_1$-$235_N$, such as network communication interface 255 for first VM $235_1$, may be assigned a unique virtual Media Access Control (MAC) address that enables virtual bridge 225 to simulate the forwarding of incoming data packets from network communication interface 112. In an example, network communication interface 112 is an Ethernet adapter that is configured in "promiscuous mode" such that all Ethernet packets that it receives (rather than just Ethernet packets addressed to its own physical MAC address) are passed to virtual bridge 225, which, in turn, is able to further forward the Ethernet packets to VMs $235_1$-$235_N$. This configuration enables an Ethernet packet that has a virtual MAC address as its destination address to properly reach the VM 235 in host computing device 100 with a virtual communication interface that corresponds to such virtual MAC address.

Virtual hardware platform $240_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 in order to execute applications 270 for an instantiated VM, such as first VM $235_1$. Aspects of the disclosure are operable with any computer architecture, including non-x86-compatible processor structures such as those from Acorn RISC (reduced instruction set computing) Machines (ARM) and operating systems other than those identified herein as examples.

Virtual hardware platforms $240_1$-$240_N$ may be considered to be part of virtual machine monitors (VMM) $275_1$-$275_N$ that implement virtual system support to coordinate operations between hypervisor 210 and corresponding VMs $235_1$-$235_N$. Those with ordinary skill in the art will recognize that the various terms, layers, and categorizations used to describe the virtualization components in FIG. 2 may be referred to differently without departing from their functionality or the spirit or scope of the disclosure. For example, virtual hardware platforms $240_1$-$240_N$ may also be considered to be separate from VMMs $275_1$-$275_N$, and VMMs $275_1$-$275_N$ may be considered to be separate from hypervisor 210. One example of hypervisor 210 that may be used in an example of the disclosure is included as a component in VMware's ESX brand software, which is commercially available from VMware, Inc.

Figure 3:
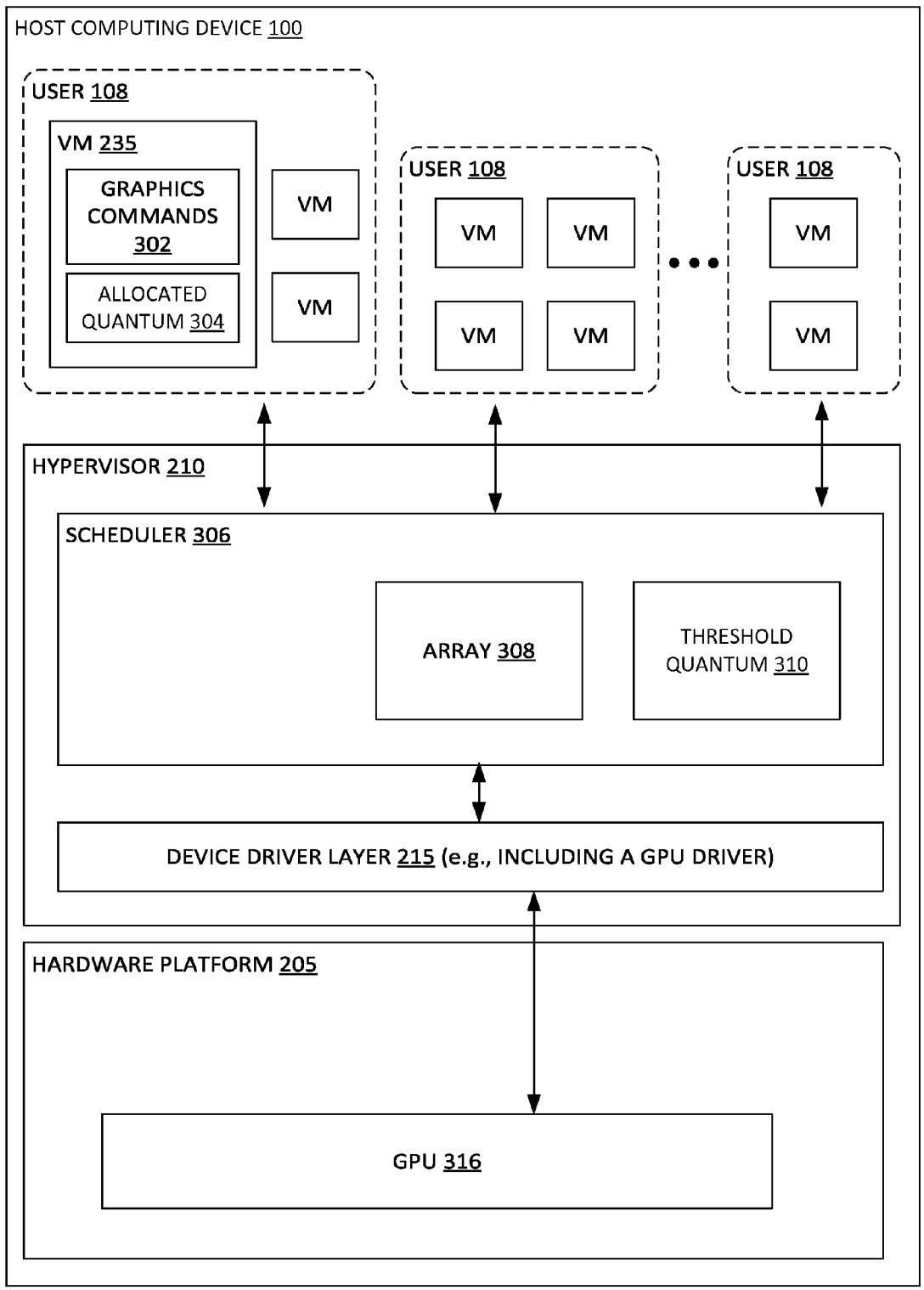
FIG. 3 is a block diagram of one or more computer storage media hosting components that allocate GPU resources among VMs.

FIG. 3 is a block diagram of an exemplary system for scheduling GPU 316 resources for use by a plurality of VMs. While described with reference to host computing device 100 in FIG. 3, aspects of the disclosure are operable with any computing device or group of computing devices. Host computing device 100 has a plurality of processes, or a plurality of VMs 235, sharing GPU 316. In some examples, VMs 235 are organized or categorized into groups (e.g., resource groups). VMs 235 may be grouped based on affiliation or ownership, such as with users 108, tenants, customers, or other entities. In the example of FIG. 3, one user 108 has three VMs executing on host computing device 100, another user has four VMs 235 executing on host computing device 100, and still another user 108 has two VMs 235 executing on host computing device 100. VMs 235 may execute simultaneously.

An administrator, such as administrator 402, of host computing device 100 establishes a total number of shares available to all users 108, and assigns a portion of the shares to each user 108. Each share is a value reflecting a proportionate share of GPU 316, reflecting relative entitlement to GPU 316. The shares may be defined in relative units.

The shares may be assigned to users 108 based on a plurality of factors. For example, the shares may be assigned based on how much each user 108 has paid to host computing device 100. Such an example corresponds to environments in which host computing device 100 is part of a cloud service. The shares may also be assigned based on quality of service (QoS) guarantees included in, for example, a service level agreement (SLA) between each user 108 and host computing device 100.

Users 108, and/or scheduler 306, may adjust the assigned shares to reflect the graphics-specific operations anticipated from VMs 235 of each user 108, such as described by graphics command characteristics 404. The assigned shares may be adjusted for a number of reasons. For example, user 108 or scheduler 306 may adjust the assigned shares based on the nature or complexity of the graphics commands 302 expected from VMs 235, based on internal priorities defined by user 108, and/or other factors. Adjusting the assigned shares includes increasing or decreasing the assigned shares based on these factors.

Graphics command characteristics 404 describe the type of graphics commands 302 expected from VMs 235, and may be defined by users 108, scheduler 306 (e.g., based on graphics commands 302 observed from VMs 235 during runtime), or other entity. For example, each VM 235 may indicate to scheduler 306 (e.g., via an application programming interface) the types of graphics commands 302 VM 235 intends to issue to permit individualized assignment and adjustment of shares by scheduler 306 or other entity.

Exemplary types of graphics commands include, but are not limited to, two-dimensional graphics commands, three dimensional graphics commands, surface mapping commands, shading commands, video commands (e.g., encoding and/or decoding), and/or texture rendering commands. Graphics command characteristics 404 may also indicate VM 235 intends to perform specific graphics commands 302 such as z-buffering, spatial anti-aliasing, alpha blending, mipmapping, atmospheric effects, and/or perspective-correct texture mapping.

Graphics command characteristics 404 may also describe the expected (or observed) runtime behavior of VMs 235. For example, graphics command characteristics 404 may indicate that during runtime, a given VM 235 may only have one discrete graphics command 302 to perform and, after that, VM 235 will have no further need of GPU 316 resources. Alternatively, graphics command characteristics 404 may indicate that VM 235 is issuing graphics commands 302 that rely on heavy user interaction. In such a scenario, the runtime behavior of that VM 235 may require more ongoing, intense use of GPU 316.

Users 108 may subdivide the shares among VMs 235 belonging to each user 108. For example, users 108 may equally divide the assigned shares among its VMs 235. Based on the shares assigned to each VM 235, quantum (e.g., a value) is allocated to each VM 235, and referred to as allocated quantum 304.

VMs 235 generate graphics commands 302. Hypervisor 210 intercepts graphics commands 302 and forwards them to scheduler 306 before graphics commands 302 are performed by GPU 316. While scheduler 306 is described as executing on host computing device 100 in this example, scheduler 306 may execute on any computing device. Further, scheduler 306 refers to any component performing the functionality described herein, and may execute in user space and/or kernel space. In the example of FIG. 3, scheduler 306 is located within hypervisor 210. Scheduler 306 may also refer to hardware configured to perform the functionality described herein.

Scheduler 306 includes an array 308 that is used by scheduler 306 to determine when to send graphics commands 302 received from VMs 235 to GPU 316. In some examples, array 308 stores, for each VM 235, the accumulated quantum and graphics commands 302 received. Graphics commands 302 may be stored in a first-in-first-out (FIFO) queue. Array 308 is not limited to an array, and any other suitable data structure may also be used. As further described herein, scheduler 306 accumulates quantum for each VM 235 in array 308 and compares the accumulated quantum to a threshold quantum 310 to determine when to send graphics commands 302 to GPU 316. Threshold quantum 310 is tuned to optimize use of GPU 316. If threshold quantum 310 is too small, GPU 316 may become overloaded. If threshold quantum 310 is too large, GPU 316 may become underloaded and remain idle for too long. Adjusting or tuning threshold quantum 310 is described further herein.

Scheduler 306 passes graphics commands 302 to GPU 316 via GPU driver 307. GPU driver 307 resides in, for example, device driver layer 215 which may be part of hypervisor 210. Alternatively or in addition, GPU driver 307 may be executed by a processor associated with GPU 316. GPU 316 is associated with hardware platform 205, in some examples.

Figure 4:
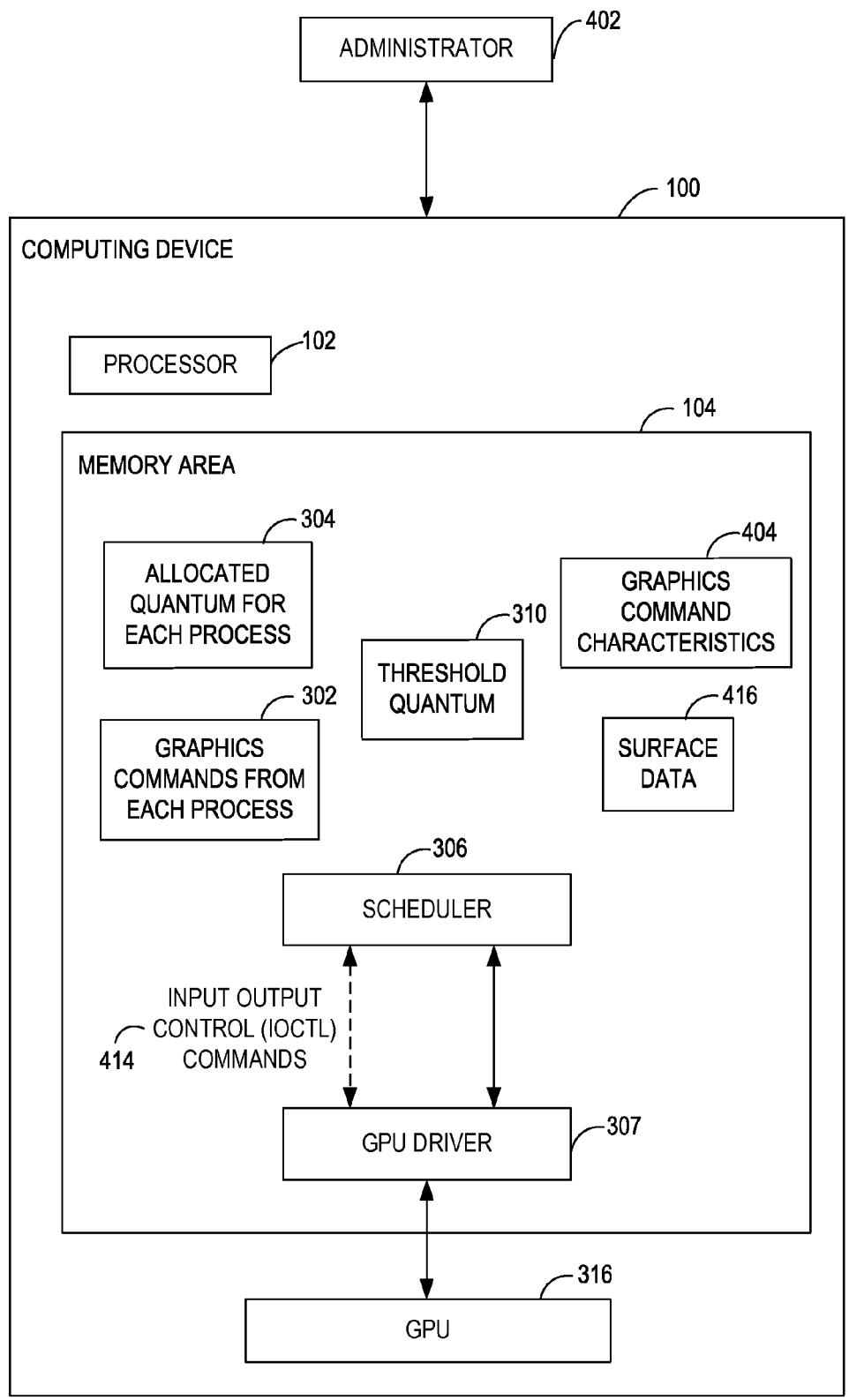
FIG. 4 is a block diagram of an exemplary computing device for managing graphics commands and VM information for scheduling and execution.

FIG. 4 is a block diagram of host computing device 100 managing execution of graphics commands 302. Administrator 402 interacts with host computing device 100. Host computing device 100 represents any device executing instructions (e.g., as application programs, operating system functionality, or both) to implement the operations and functionality described herein. Host computing device 100 may include any computing device or processing unit. For example, host computing device 100 may represent a group of processing units or other computing devices, such as in a cloud computing configuration.

Host computing device 100 has at least one processor 102 and memory area 104. Processor 102 includes any quantity of processing units, and is programmed to execute computer-executable instructions for implementing aspects of the disclosure. The instructions may be performed by processor 102 or by multiple processors executing within host computing device 100, or performed by a processor external to host computing device 100. In some examples, processor 102 is programmed to execute instructions such as those illustrated in the figures to implement the scheduling of graphics commands 302.

Memory area 104 includes any quantity of computer-readable media associated with or accessible by host computing device 100. Memory area 104, or portions thereof, may be internal to host computing device 100, external to host computing device 100, or both.

In the example of FIG. 4, memory area 104 stores allocated quantum 304 for each of one or more VMs 235 (or processes), threshold quantum 310 (e.g., dynamically adjustable), and graphics commands 302 received from VMs 235. Memory area 104 also stores surface data 416. Surface data 416 represents data for use by GPU 316 when executing one or more corresponding graphics commands 302. Surface data 416 may be sent to GPU 316 with the first graphics command 302 that uses surface data 416, or may be sent during initialization of scheduler 306 or GPU 316. Memory area 104 further stores graphics command characteristics 404.

Host computing device 100 further includes GPU 316. Scheduler 306 communicates with GPU 316 via, for example, GPU driver 307. GPU driver 307 operates GPU 316. Aspects of the disclosure also contemplate a communication channel through which scheduler 306 communicates with GPU 316. For example, scheduler 306 transmits values corresponding to allocated quantum 304 for each VM 235, as well as threshold quantum 310. For example, scheduler 306 may send an input/output control (IOCTL) command 414 over the communication channel. IOCTL command 414 represents any means for communication between host computing device 100 and GPU 316, and may occur via any component therebetween. Aspects of the disclosure are operable with any IOCTL type or configuration.

Figure 5:
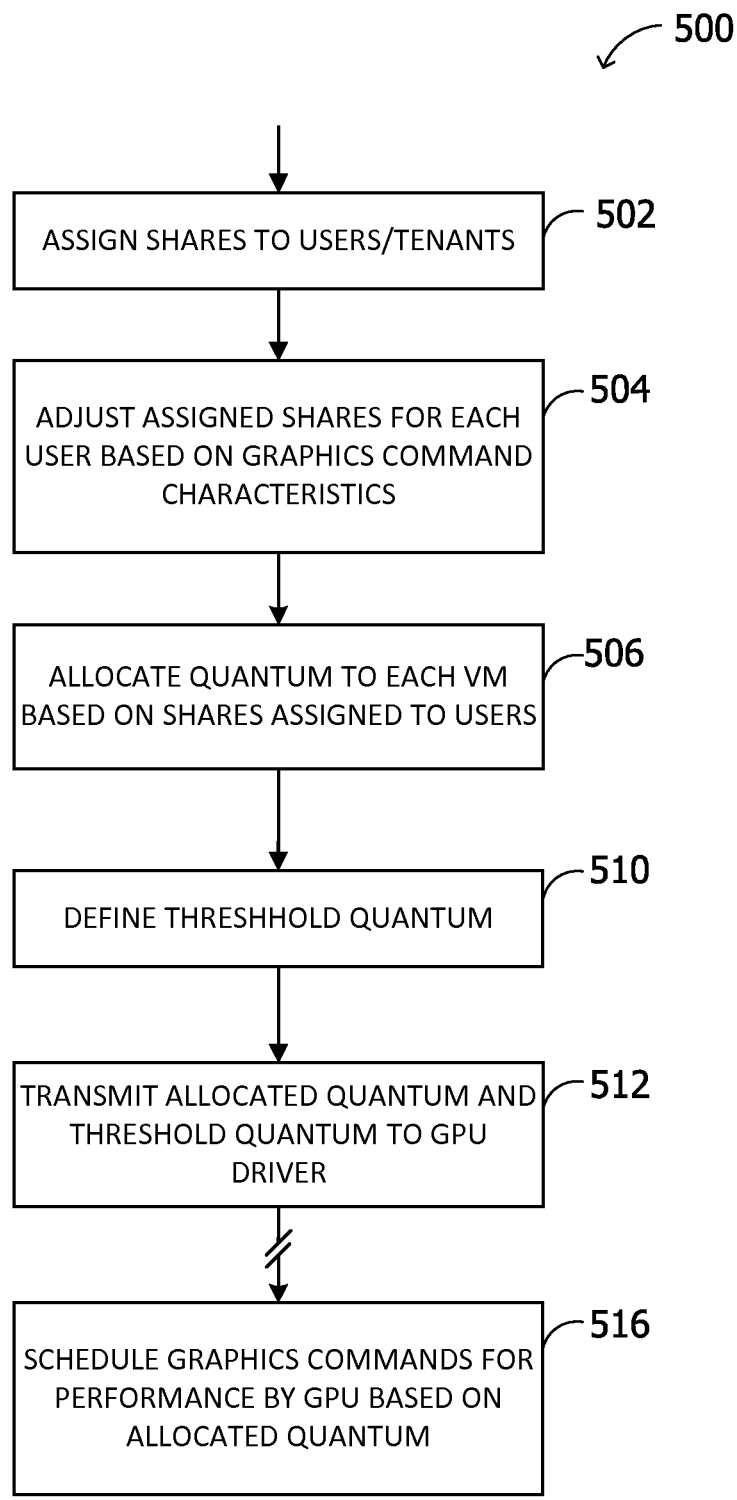
FIG. 5 is a flowchart of an exemplary method performed by the scheduler at initialization to allocate quantum among VMs.

FIG. 5 is a flowchart of an exemplary method 500 performed by host computing device 100 (e.g., during an initialization phase). In particular, execution of method 500 allocates quantum to VMs 235 based on assigned shares and subsequently schedules graphics commands 302 based thereon. While method 500 is described with reference to execution by host computing device 100, it is contemplated that method 500 may be performed by any component of any computing device.

At 502, host computing device 100 (e.g., scheduler 306) assigns shares to each user 108, tenant, customer, or other entity executing VMs 235 or processes on host computing device 100. In some examples, host computing device 100 assigns the shares based on input received from administrator 402. As described herein, the quantity of assigned shares per user 108 may be determined by a value of payment amounts from each user 108, a privilege level of user 108, a type of VM or process associated with user 108, or any other criteria. For example, users 108 may negotiate SLAs to define the portion of GPU 316 assigned to each user 108. One method of assigning shares may be through an automated algorithm. In some examples, host computing device 100 applies a weighted combination as shown in Equation (1) below to determine a quantity of shares per user 108.

$$\text{shares} = \text{payment} * \log(\text{user interaction}) \quad (1)$$

In this example, both the payment provided by the user and the amount of interaction from user 108 (e.g., continuing input) affects the quantity of shares assigned to user 108.

At 504, host computing device 100 (e.g., scheduler 306) adjusts the shares assigned to one or more of users 108 based on graphics command characteristics 404, or other characteristics, associated with the VMs or processes of users 108. For example, because more sophisticated graphics commands 302, such as three-dimensional commands versus two-dimensional commands, generally require more GPU 316 resources, the assigned shares for users 108 with VMs 235 expected to generate such graphics commands 302 may be increased. This amount may be adjusted formulaically or programmatically. Conversely, the assigned shares for users 108 with VMs 235 expected to generate graphics commands 302 that are less resource-intensive may be decreased. In this manner, the initial assignment of shares is customized based on the anticipated graphics commands 302, thereby creating a customized share assignment for each of users 108.

In an example involving Users A, B, C, and D where the total quantity of shares is 1400, host computing device 100 may assign User A 200 shares, User B 300 shares, User C 500 shares, and User D 400 shares. In this example, the User A shares represent 14.3% of the total shares, the User B shares represent 21.4% of the total shares, the User C shares represent 35.7% of the total shares, and the User D shares represent 28.6% of the total shares, as shown in Table 1 below.

TABLE 1

Example Division of Shares Among Users.

| USER | SHARE | % SHARE |
| --- | --- | --- |
| User A | 200 | 14.3% |
| User B | 300 | 21.4% |
| User C | 500 | 35.7% |
| User D | 400 | 28.6% |
| TOTAL | 1400 | 100% |

At 506, host computing device 100 (e.g., scheduler 306) allocates quantum to each process (e.g., VM 235) based on the adjusted, assigned shares. Host computing device 100 allocates the quantum based on, for example, input received from each of users 108. In some examples, users 108 use a tool such as VMTools by VMware, Inc. to provide the input to host computing device 100.

The allocated quantum 304 reflects a subdivision of the assigned shares. For example, each user 108 may subdivide the shares equally among VMs 235 (e.g., to ensure that each VM 235 has equal access to GPU 316), or unequally among VMs 235. The allocated quantum for each VM 235 of one of users 108 represents the relative portion of the subdivision of the shares assigned to that user 108. The quantum may be allocated based on various criteria, including the graphics commands characteristics. This enables user 108 to consider the complexity of graphics commands 302 of each VM 235, as well as the expected experience from the perspective of each VM 235. For example, even though a particular VM 235 may be expected to issue low-complexity graphics commands 302, user 108 may want that VM 235 to have a fast user experience and hence allocate more quantum to that VM 235 than other of its VMs 235, thus permitting the less complex commands to be performed quickly. Alternatively or in addition, users 108 allocate quantum among VMs 235 based on an internal prioritization of tasks associated with each of VMs 235. In this scenario, user 108 may assign more quantum to VMs 235 running resource-intensive graphics commands 302 than to VMs 235 expected to generate few graphics commands 302. Further, user 108 may choose to not allocate any quantum to one of its VMs 235 (e.g., to a VM not expected to generate any graphics commands 302).

Continuing the above example involving Users A, B, C, and D, User D may have four VMs 235. User D may then allocate quantum equally among its four VMs 235 by allocating a value of 100 to each of its VMs 235. While the shares are divided equally among VMs 235 in this example, aspects of the disclosure are operable with unequal allocated quantum 304. Each of VMs 235 of User D then has an allocated quantum 304 value of 100, which corresponds to 7.1% of the total number of shares available to all users 108 because there are 1400 shares available.

At 510, host computing device 100 (e.g., scheduler 306) defines a value for threshold quantum 310. Threshold quantum 310 controls when scheduler 306 transmits graphics commands 302 received from VMs 235 to GPU driver 307 for execution by GPU 316. Threshold quantum 310 may start as a default value that is adjusted dynamically during runtime to optimize loading of GPU 316. Use of threshold quantum 310 is further described and illustrated with reference to FIG. 6.

At 512, host computing device 100 (e.g., scheduler 306) transmits the values corresponding to allocated quantum 304 and threshold quantum 310 to GPU driver 307. For example, host computing device 100 sends these values as parameters in one or more IOCTL commands to GPU driver 307. GPU 316 and GPU driver 307 are expected to respect these values when executing graphics commands 302, as described in FIG. 6.

Subsequently, during runtime at 516, scheduler 306 in host computing device 100 schedules graphics commands 302 for performance by GPU 316 based on the allocated quantum 304.

Figure 6:
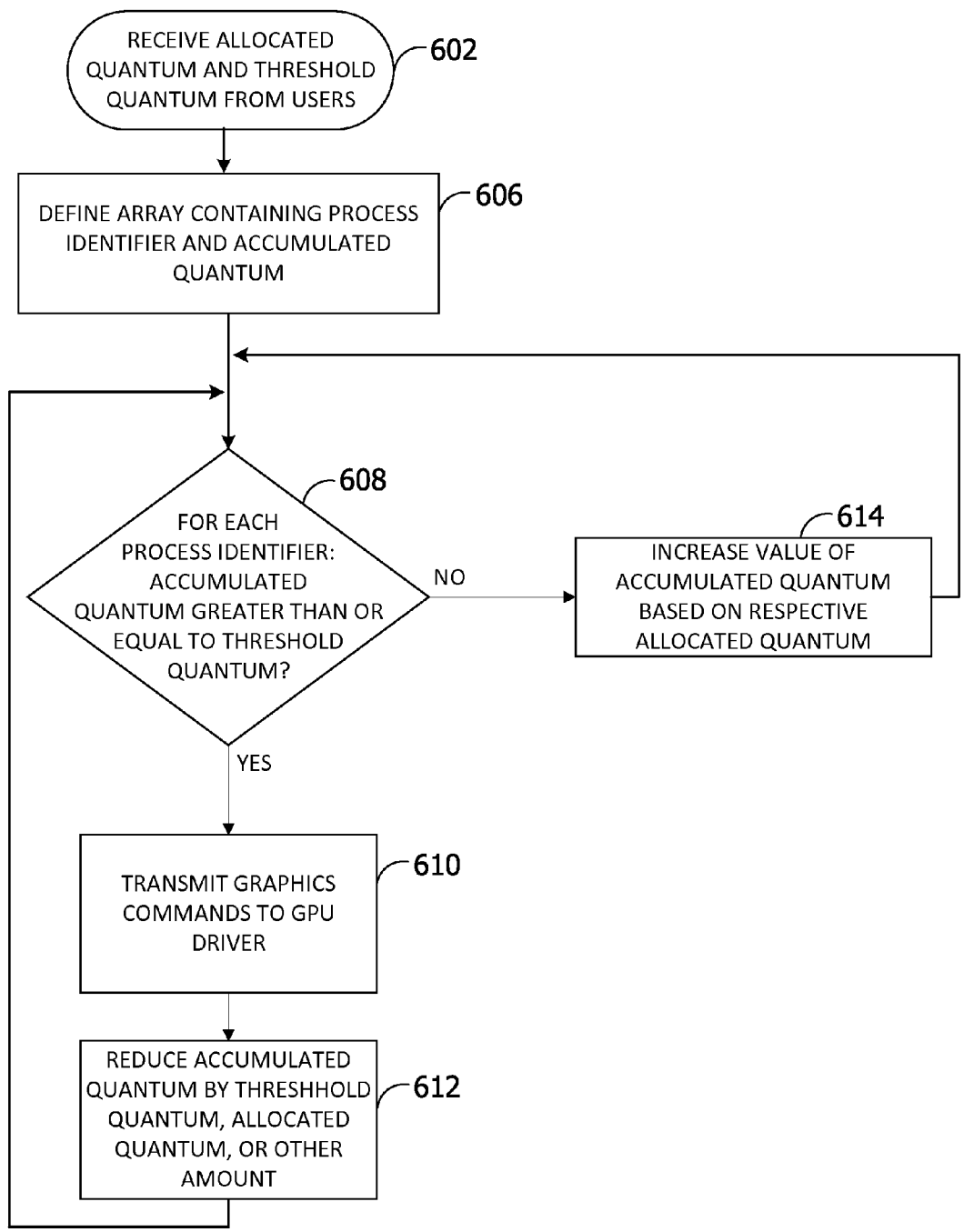
FIG. 6 is a flowchart of an exemplary method performed by the scheduler at runtime to create an array to store and iteratively process graphics commands based on the allocated quantum.

FIG. 6 is a flowchart of an exemplary method 600 performed by host computing device 100 to create a dynamic array 308 that reflects the priority of graphics commands 302 of VMs 235. Array 308 is used to determine when to transmit graphics commands 302 received from VMs 235 to GPU 316. While described as being executed by host computing device 100 (e.g., scheduler 306), it is contemplated that method 600 may be performed by any component of any computing device.

At 602, scheduler 306 accesses allocated quantum 304 and threshold quantum 310. For example, allocated quantum 304 and threshold quantum 310 are defined as described with reference to FIG. 5. Alternatively or in addition, scheduler 306 may execute the operations illustrated in FIG. 6 without first executing the operations illustrated in FIG. 5. In such examples, scheduler 306 receives values for allocated quantum 304 and threshold quantum 310 from another computing device or from another entity. Further, there may be one threshold quantum 310 for graphics commands 302, one threshold quantum 310 for each group of graphics commands 302 (e.g., each group corresponding to a different VM 235), and/or one threshold quantum 310 for each graphics command 302. By having different threshold quantums 310 for different graphics commands 302, the threshold quantums 310 may be adjusted such that graphics commands 302 that take more resources are made to wait longer for those resources.

Scheduler 306 updates, or creates, a queue to hold graphics commands 302 received from VMs 235 during execution of VMs 235. At 606, scheduler 306 updates, or creates, array 308. Each of VMs 235 has an entry in array 308. Each entry stores a process identifier such as VM ID for one of VMs 235, and a value corresponding to accumulated quantum for that process identifier. At the start of runtime, accumulated quantum is zero for each VM 235, or may be set to a value corresponding to allocated quantum 304.

Scheduler 306 operates according to clock cycles, ticks, taps, rounds, or other iterative unit of execution or operation. During each round, each entry (e.g., corresponding to at least one VM 235) accumulates quantum which is compared to threshold quantum 310 to determine whether to transmit graphics commands 302 to GPU 316. For example, during each round, scheduler 306 increases the value of accumulated quantum for each VM 235 in array 308. Examples for updating array 308 are illustrated as array 702 in FIG. 7. Each round may occur, for example, every 15 milliseconds although other round durations are contemplated.

For each entry (e.g., VM 235) in array 308, scheduler 306 compares the accumulated quantum to threshold quantum 310 at 608. If the accumulated quantum for VM 235 is less than threshold quantum 310, scheduler 306 increases the value of accumulated quantum for that VM 235. The amount of increase corresponds to allocated quantum 304 for that VM 235.

If the accumulated quantum for VM 235 is greater than or equal to threshold quantum 310, scheduler 306 forwards the queued graphics commands from VM 235 to GPU driver 307 at 610. GPU driver 307 then manages execution of these graphics commands 302 by GPU 316. In this manner, scheduler 306 "fires" graphic commands 302 only when the accumulated quantum meets or exceeds a predefined threshold quantity.

In some examples, VM 235 also sends surface data 416 to GPU driver 307 for use when GPU 316 executes graphics commands 302.

At 612, scheduler 306 reduces the value of accumulated quantum associated with VM 235 whose graphics commands were sent to GPU driver 307. In one example, scheduler 306 reduces the accumulated quantum by an amount corresponding to allocated quantum 304 for that VM

235. Alternatively, scheduler 306 may reduce the accumulated quantum by an amount corresponding to threshold quantum 310, or any other amount.

Operations 608, 610, 612, and 614 are performed, during each round, for each of VMs 235 in array 308. The operations may be performed in sequence (e.g., one VM 235 at a time), in parallel (e.g., two or more VMs 235 at the same time), or some combination thereof. If scheduler 306 transmits graphics commands 302 for two or more VMs 235, scheduler 306 may prioritize the transmission such that the VM 235 with the greater amount of accumulated quantum is transmitted first. After array 308 has been processed, scheduler 306 returns to 608 to process array 308 in the next round.

In an example, upon receipt of graphics commands 302 from scheduler 306, GPU driver 307 executes graphics commands 302 using GPU 316 while respecting allocated quantum 304 for each VM 235. For example, GPU 316 may convert each allocated quantum 304 into a time slice, priority, quantity of assigned GPU 316 cores, or other unit or metric of execution of GPU 316. If execution by GPU 316 of the received graphics commands 302 from a particular VM 235 has not completed within the time slice corresponding to allocated quantum 304 for that VM 235, GPU 316 suspends execution of graphics commands 302 from that VM 235 and proceeds to execute graphics commands from other VMs 235. In this manner, GPU 316 respects the relative priorities of VMs 235, and prevents starvation of any one GPU resource group.

FIG. 7 is an example of array 308 maintained by scheduler 306 to iteratively tabulate the accumulated quantum and compare the accumulated quantum to threshold quantum 310. In this example, each VM 235 is represented in the column on the far left. Each subsequent column represents one iteration (e.g., one execution round) of the operations 608, 610, 612, and 614 illustrated in FIG. 6. At Time 1, scheduler 306 assigns values in the column labeled Time 1 representing the initial accumulated quantum given to each VM 235. In this example, the initial accumulated quantum equals allocated quantum 304 for each VM 235.

Scheduler 306 then compares the accumulated quantum for each VM 235 to threshold quantum 310. In this example, considering an exemplary threshold quantum of 1.5, none of the accumulated quantum in the column under Time 1 meets or exceeds threshold quantum 310. Scheduler 306 increases the accumulated quantum for each VM 235 by the respective allocated quantum 304, as shown in the column under Time 2. In this column, VM1 has increased its accumulated quantum by 0.75 (the exemplary amount of its allocated quantum 304), VM2 has increased its accumulated quantum by 1, VM3 has increased its accumulated quantum by 1.25, and VM4 has increased its accumulated quantum by 0.5.

With these increases, the accumulated quantum for VMs 1, 2, and 3 now meet or exceed the threshold quantum of 1.5. Scheduler 306 then allows these VMs to send any queued graphics commands 302 to GPU driver 307 for execution. In some examples, surface data 416 associated with graphic commands 302 is also sent to GPU driver 307 (e.g., if not sent previously during initialization or during a previous graphics command 302).

After sending graphics commands 302 for VMs 1, 2, and 3, scheduler 306 reduces the accumulated quantum for VMs 1, 2, and 3. In this example, the accumulated quantum is reduced by the value of the threshold quantum. However, in other examples, the accumulated quantum may be reduced by another value.

The reduction in accumulated quantum for VMs 1, 2, and 3 is reflected in the next column under Time 3. In that column, VMs 1, 2, and 3 reflect a reduction to their accumulated quantum, while VM4 reflects an increase in accumulated quantum because VM 4 did not fire. At Time 3, scheduler 306 again compares the accumulated quantum to threshold quantum 310 and determined that only VM4 should send graphics commands 302. Scheduler 306 allows VM4 to send graphics commands to GPU driver 307 for execution. Scheduler 306 decreases the accumulated quantum for VM4, and increases the accumulated quantum for VMs 1, 2, and 3. The values in the column under Time 4 reflect these adjustments in accumulated quantum. At Time 4, scheduler 306 again compares the accumulated quantum to threshold quantum 310 and determines that VMs 2 and 3 may send graphics commands 302 to GPU driver 307 for execution. Graphics commands 302 for VMs 2 and 3 are sent, the accumulated quantum for these VMs is decreased by threshold quantum 310, the accumulated quantum for the VMs that did not send graphics commands 302 is increased by threshold quantum 310, and the iterative process continues.

The iterative process represented in the example of array 702 may continue indefinitely. Alternatively, the process may continue until all graphics commands 302 of VMs 235 have been executed, until all VMs 235 have stopped executing, until a finite quantity of graphics commands 302 have been executed, or responsive to a condition of GPU 316 (e.g., overheating). For example, if one of VMs 235 stops executing, scheduler 306 sends another IOCTL command to GPU driver 307 to indicate that the VM 235 has stopped executing, and to set allocated quantum 304 for that VM 235 to zero. Further, host computing device 100 may re-allocate allocated quantum 304 for the stopped VM 235 among other VMs 235 in the same group (e.g., from the same user 108), and update GPU driver 307 of the revised allocated quantum 304 values for these other VMs 235.

ADDITIONAL EXAMPLES

The following scenarios are merely exemplary and not intended to be limiting in any way.

During initialization, host computing device 100 may determine that, based on graphics command characteristics 404 for a particular VM 235, any graphics commands 302 from this VM 235 may be rendered through software rendering versus hardware rendering. Host computing device 100 then sets allocated quantum 304 for this VM 235 to zero, and re-allocates any previously-allocated quantum 304 for this VM 235 to the other VMs 235 in the same group (e.g., same user 108 or tenant).

During runtime, scheduler 306 may poll GPU 316 to determine a real-time load experienced by GPU 316 when processing graphics commands 302. Scheduler 306 may dynamically adjust threshold quantum 310 accordingly. For example, threshold quantum 310 may be increased if GPU 316 is overloaded, to reduce the frequency of graphics commands 302 being sent to GPU 316. In another example, threshold quantum 310 may be decreased if GPU 316 is underutilized, to increase the frequency of graphics commands 302 sent to GPU 316.

Alternatively, scheduler 306 may also poll GPU 316 to determine its utilization, temperature, memory error count, or for any other information which may affect GPU 316 performance. Depending on how efficiently GPU 316 is processing graphics commands, scheduler 306 may reduce or increase threshold quantum 310 to change the load on GPU 316.

During runtime, scheduler 306 may enforce an upper limit on accumulated quantum. In this example, scheduler 306 prevents one VM 235 from monopolizing GPU 316 resources. In such an example, scheduler 306 will not increase accumulated quantum for that VM 235 above an upper ceiling value.

In some embodiments, hypervisor 210 shares GPU 316 among multiple VMs 235 using scheduler 306. In other embodiments, a computer may similarly share a GPU among multiple processes running on the computer using a resource scheduler.

Exemplary Operating Environment

The operations described herein may be performed by a computer or computing device, such as host computing device 100. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some examples, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special-purpose computing device (e.g., host computing device 100) when programmed to execute the instructions described herein.

The examples illustrated and described herein as well as examples not specifically described herein but within the scope of aspects of the disclosure constitute exemplary means for scheduling limited GPU 316 resources among a multitude of users 108 with assorted graphics commands 302. Some examples contemplate means for fairly sharing GPU 316 among VMs 235. For example, the elements illustrated in FIG. 2, FIG. 3, and/or FIG. 4, such as when encoded to perform the operations illustrated in FIG. 5 and/or FIG. 6, constitute exemplary means for assigning shares to user 108 having one or more of VMs 235 associated therewith, exemplary means for adjusting the assigned shares based on graphics command characteristics 404 associated with VMs 235, exemplary means for allocating quantum among VMs 235 based on the adjusted, assigned shares, exemplary means for transmitting allocated quantum 304 for each of VMs 235 to GPU driver 307, and exemplary means for scheduling, by host computing device 100 based on allocated quantum 304, graphics commands 304 from VMs 235 for performance by GPU driver 307, wherein GPU driver 307 performs the graphics commands 302 based on the transmitted, allocated quantum 304.

At least a portion of the functionality of the various elements illustrated in the figures may be performed by other elements in the figures, or an entity (e.g., processor, web service, server, application program, computing device, etc.) not shown in the figures.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

We claim:

1. One or more non-transitory computer storage media embodying computer-readable instructions for fairly sharing a graphics processing unit (GPU) among a plurality of virtual machines (VMs), the instructions when executed cause at least one processor to:
   assign shares to a user having one or more VMs associated therewith;
   adjust the assigned shares based on graphics command characteristics associated with the VMs;
   allocate quantum among the VMs based on the adjusted, assigned shares;
   define a threshold quantum for graphics commands associated with each of the VMs for scheduling;
   transmit the allocated quantum for each of the VMs and the defined threshold quantum to a GPU driver;
   receive graphics commands from one or more of the VMs;
   accumulate the allocated quantum for each of the VMs and campare the accumulated quantum to the defined threshold quantum; and
   for each of the one or more of the VMs, send the received graphics commands to the GPU driver when the accumulated quantum is greater than or equal to the defined threshold quantum based on the comparison,
   wherein the GPU driver performs the sent graphics commands for each of the one or more VMs based on the allocated quantum for the VM.

2. The non-transitory computer storage media of claim 1, wherein the computer-readable instructions executed by the at least one processor cause the processor to assign the shares based on a quality of service (QoS) guarantee.

3. The non-transitory computer storage media of claim 1, wherein the computer-readable instructions executed by the at least one processor cause the processor to assign the shares based on an amount of payment from the user to a cloud service hosting the one or more VMs.

4. The non-transitory computer storage media of claim 1, wherein the graphics command characteristics indicate a type of graphics commands to be issued by the VMs.

5. The non-transitory computer storage media of claim 1, wherein the graphics command characteristics describe a runtime behavior of the VMs.

6. The non-transitory computer storage media of claim 1, wherein the graphics command characteristics indicate whether the VMs are configured to issue at least one of: two-dimensional graphics commands, three-dimensional graphics commands, surface mapping commands, shading commands, video encoding/decoding, or texture rendering commands.

7. The non-transitory computer storage media of claim 1, wherein allocating the quantum among the VMs comprises equally dividing the adjusted shares among the VMs.

8. The non-transitory computer storage media of claim 1, wherein the computer-readable instructions executed by the at least one processor cause the processor to transmit the allocated quantum for each of the VMs and the defined threshold quantum to the GPU driver via an input/output control (IOCTL) command.

9. The non-transitory computer storage media of claim 1, wherein the at least one processor is within a hypervisor on the computing device.

10. A method comprising:
    assigning, by a computing device, shares to a user having one or more virtual machines (VMs) associated therewith;
    adjusting the assigned shares based on graphics command characteristics associated with the VMs;
    allocating, by the computing device, quantum among the VMs based on the adjusted, assigned shares;
    transmitting the allocated quantum for each of the VMs to a graphics processing unit (GPU) driver;
    receiving graphics commands from one or more of the VMs;
    scheduling, by the computing device, graphics operations from the VMs for performance by a GPU managed by the GPU driver, by accumulating the allocated quantum for each of the VMs and comparing the accumulated quantum to a threshold quantum; and
    for each of the one or more of the VMs, sending the received graphics commands to the GPU driver when the accumulated quantum is greater than or equal to the threshold quantum based on the comparison.

11. The method of claim 10, wherein the allocated quantum for each of the VMs is transmitted to the GPU driver via an input/output control (IOCTL) command.

12. The method of claim 10, wherein accumulating the allocated quantum for each of the VMs comprises maintaining the accumulated quantum in an array.

13. The method of claim 10, wherein the threshold quantum is dynamically adjusted at run time to optimize loading of the GPU.

14. The method of claim 10, wherein scheduling the graphics operations comprises sending the graphics operations to the GPU driver based on the comparison.

15. The method of claim 14, wherein sending the graphics operations comprises sending an amount of the graphics operations from one of the VMs corresponding to the allocated quantum for the one of the VMs.

* * * * *